United States Patent [19]

Kestenbaum et al.

[11] Patent Number: 5,559,626
[45] Date of Patent: Sep. 24, 1996

[54] ENERGY RESOURCE SHARING METHOD AND APPARATUS

[75] Inventors: Ami Kestenbaum, West Windsor Township; Richard S. Armington, Hopewell, both of N.J.

[73] Assignee: National Center for Manufacturing Sciences, Ann Arbor, Mich.

[21] Appl. No.: 394,360

[22] Filed: Feb. 24, 1995

Related U.S. Application Data

[63] Continuation-in-part of Ser. No. 103,099, Aug. 9, 1993.
[51] Int. Cl.$^6$ ................................................ H04B 10/12
[52] U.S. Cl. ................ 359/144; 359/135; 364/273.2; 364/273.5; 364/DIG. 1; 340/333; 455/3.3
[58] Field of Search .................................. 359/125, 126, 359/132, 133, 144, 147, 168, 171, 118, 119

[56] References Cited

U.S. PATENT DOCUMENTS

| | | | |
|---|---|---|---|
| 4,434,510 | 2/1984 | Lemelson | 359/168 |
| 4,710,977 | 12/1987 | Lemelson | 359/171 |
| 5,323,256 | 6/1994 | Banks | 359/144 |
| 5,389,963 | 2/1995 | Lepley | 359/125 |

FOREIGN PATENT DOCUMENTS 0128847  7/1984  Japan ........................ 359/171

Primary Examiner—Leslie Pascal
Attorney, Agent, or Firm—Gifford, Krass, Groh, Sprinkle, Patmore, Anderson & Citkowski

[57] ABSTRACT

A resource-sharing system enables multiple work areas to share an energy resource on a real-time, asynchronous basis in order to perform manufacturing processes. A specific embodiment involves a communication and control structure for a distributed laser processing system wherein the work areas, in communication with a cell controller via a cell-level LAN, share high-power lasers through beam multiplexers and optical fibers. The cell controller, typically in communication with a factory information system computer over a factory-level network, receives information relating to processes to be performed in the workareas, and makes this information available to the workareas as a node in the cell-level LAN. With such an arrangement, tools requiring the laser energy within the work areas may be controlled in real time by their associated station controllers, as cell controller need only be responsible for coordinating more global activities. The implementation of a digital switching network enables a particular work area to assume direct, real-time and asynchronous control of one of the laser resources in accordance with the requirements of a given materials processing application.

7 Claims, 1 Drawing Sheet

ENERGY RESOURCE SHARING METHOD AND APPARATUS

REFERENCE TO RELATED APPLICATIONS

This is a continuation-in-part of U.S. patent application Ser. No. 08/103,099, filed Aug. 9, 1993.

FIELD OF THE INVENTION

This invention relates generally to systems wherein an energy resource may be shared by multiple work areas and, in particular, to methods and apparatus which allow lasers associated with manufacturing processes to be shared on a real-time basis.

BACKGROUND OF THE INVENTION

The expense of certain types of materials processing equipment resources can render such resources economically difficult to justify for smaller organizations, and, as such, may leave a manufacturer with no choice but to employ more traditional and less productive methods. One solution, however, is to share more costly resources among several operators or work areas, thereby permitting greater utilization of such equipment and enhancing the financial aspects of the overall system through shorter payback periods. Such resource sharing also permits improved productivity, reduced component fabrication cost, an ability to process a greater variety of components simultaneously, and a more flexible system, better able to meet changing schedules. Overall, in many circumstances, sharing of costly resources may lead to a more competitive position in desired marketplaces.

In recent years, significant progress has been made in the application of lasers to materials processing. This progress has been two-fold, through developments in higher-power laser sources and, additionally, through more innovative approaches to beam-delivery problems. Efficient beam delivery, which is crucial to any industrial laser processing application, has been improved through the introduction of low-loss industrial-type optical fibers which, in turn, have introduced new system design possibilities. These novel fiber-based beam-delivery techniques are capable of reducing system cost and, consequently, such approaches may directly affect the economics of laser-based materials processing.

One advantage of fiber-based beam-delivery in the realm of materials processing is its adaptability to modern flexible-manufacturing techniques. Time multiplexing and energy multiplexing may be carried out with fiber-based beam delivery in a relatively straightforward conceptual manner, with distributed computer control being applied to realize full system potential. An optimal configuration would include an architecture and interfaces to provide real-time control over various laser functions while supporting necessary communication between work areas and factory-information systems.

As it happens, however, the sharing of multiple resources among multiple work areas demands much more than a straightforward interconnection scheme and time multiplexing. To achieve desired computer control and coordination of activities associated with all system elements, a complex communication and control structure must necessarily be imposed with hardware and software exhibiting the bandwidth and response time required for efficient operation at all system levels. In some cases, distributed communication via local-area network may be appropriate, whereas direct, real-time digital input/output may be necessary between the hardware resources and the tools which benefit from those resources.

With specific regard to laser-based processing, once energy is directed to a particular work area by selecting the proper output fiber, the equipment controller must be able to assume control of the laser, including the ability to fire the laser quickly, with a circuit delay time between the request and the actual time at which the laser fires of milliseconds or less. This is practically impossible in conventional hierarchically designed process control systems, wherein instructions must be distributed and interpreted at multiple levels before control of resources may be relinquished or assumed. The required signaling speed may be achieved by direct hardware connection of digital control between equipment controllers and lasers, but with multiple resources and work areas demanding those resources, contention between competing control signals must be properly arbitrated.

SUMMARY OF INVENTION

The present invention provides the required real-time time control over various resource functions and supports the necessary communication and coordination required of a fully integrated distributed energy-sharing system. In one embodiment, laser energy is shared, though the system is applicable to any resource capable of being time-multiplexed. To achieve the desired interaction of all system elements, the invention implements a distributed cell-control architecture operating over a local area network. In the case of two workstations competing for multiple laser resources, the control system uses a central cell controller which interfaces to the lasers and beam multiplexers and acts as a file server for the workstation nodes. The workstation nodes interface with local controllers over serial and parallel I/O lines.

In order to facilitate high-speed, real-time control over the laser resources, an inventive real-time digital signal network is implemented with hardware switches which connect control signals between the lasers, equipment controllers and the cell controller in accordance with control software. Energy redirection through the multiplexers, laser control signal arbitration, and control signal routing through this hardware switch are managed by software resident on the cell controller.

Software is preferably included to minimize "makespan," which is the time required from the beginning of a schedule through completion of the last job in the sequence. Resource allocation software is additionally preferably included to arbitrate contending requests for system resources, allocate those resources by controlling the real-time digital network hardware and fiber-beam multiplexers, and apprise an operator of the current system configuration. A job scheduling algorithm may be included to determine the sequence of jobs, chosen from a queue, to be processed through the multiple work areas using one or more of the lasers, which may be from different manufacturers. A method utilizing structured programming, in conjunction with digital I/O, supports limited interrupt capabilities.

DETAILED DESCRIPTION OF THE PREFERRED EMBODIMENTS

Figure 1:
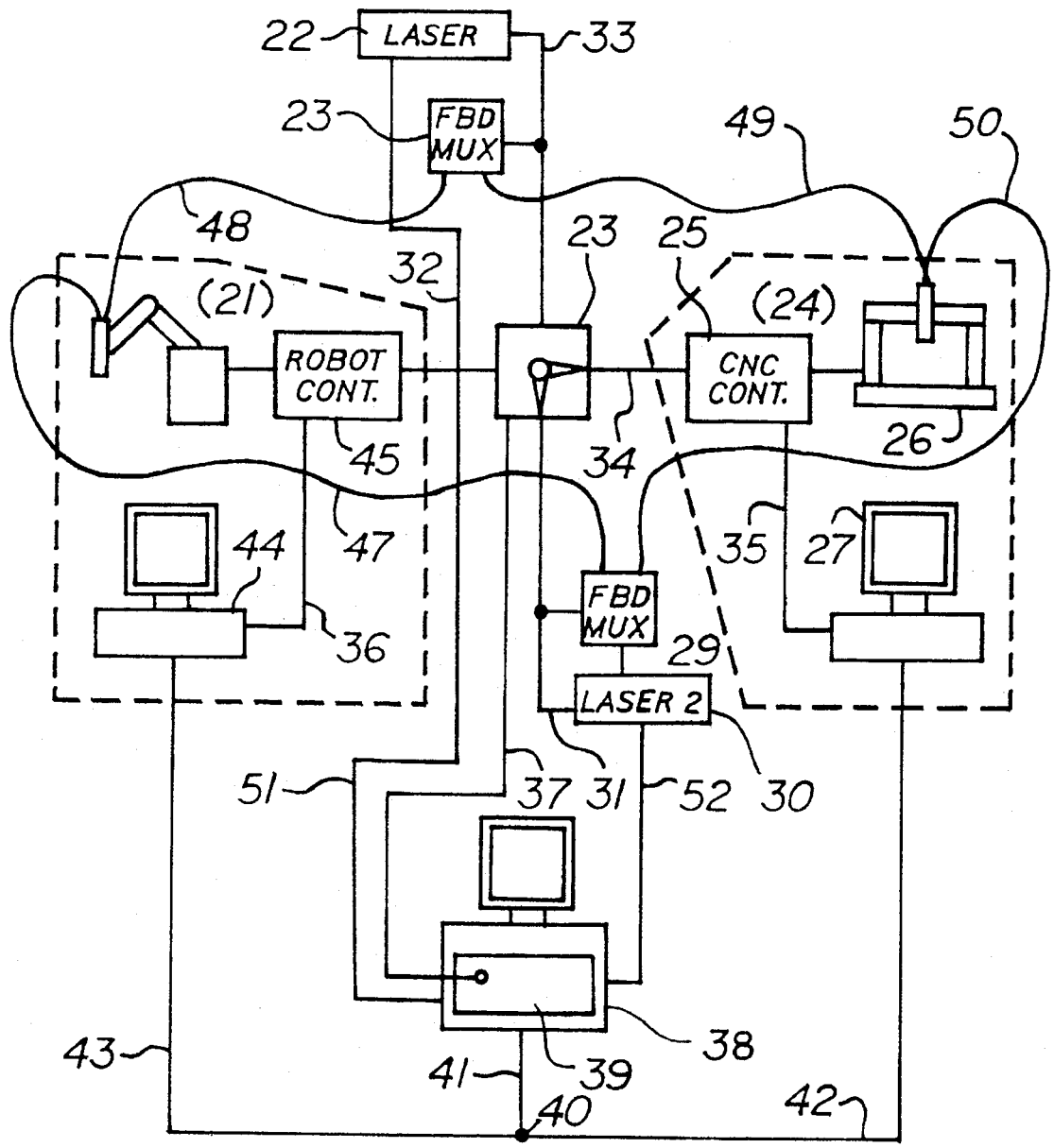
FIG. 1 is a block diagram of a communication and control structure for a distributed laser processing system according to the present invention.

The present invention is directed toward the sharing of resources, particularly those associated with manufacturing processes. Generally speaking, an objective of the invention is to allow multiple work areas to take advantage of energy-based resources which otherwise might not be used to their fullest extent. By enabling multiple operators to take advantage of such equipment, productivity is enhanced, and the expenses associated with these resources is reduced.

In one embodiment, the present invention takes the form of a communication and control structure for a distributed laser processing system, wherein high-powered lasers of the type used for materials processing are shared in a manufacturing environment. Such lasers may be used for various functions, including welding, drilling, cutting and the like. In particular, the present invention allows different laser systems from different manufacturers to be shared over a time-multiplexed beam-delivery system in conjunction with serial and parallel networking and software components which will be described in detail in subsequent sections.

It should be understood, however, that although the following detailed description concerns the sharing of laser resources within a materials processing application, the present invention is by no means limited to this specific implementation. Broadly, the advantages and techniques made available by the present invention are readily transferrable to any environment wherein multiple work areas must take advantage of multiple resources on a real-time basis. One can imagine applications wherein other forms of energy must be shared on a similarly high-speed basis, including other forms of optical energy, radiant energy, or electrical energy. For example, any type of system which might require multiple operators to use a specialized energy resource associated with a costly generation means associated with that energy may advantageously implement the communication and control structures delineated and implied by the present invention, particularly if in sharing these resources, it is necessary that control be relinquished by a more centralized hierarchy in order for the various work areas to assume direct, real-time and asynchronous control of the energy or other capabilities which may be derived from a particular resource.

Now making reference to the figure, there is depicted generally a block diagram of a hierarchical communication and control structure applicable to a resource-sharing system, in this case, a distributed laser processing system. At a high informational level, a cell controller 38, implemented as a personal computer, typically communicates with a factory computer (not shown), receiving data, for example, from a factory database. At a lower point in the hierarchy, the cell controller 38 coordinates the activities which take place in various workareas. There are two such workareas, 21 and 24 in the embodiment shown, though a greater number of such areas may be accommodated by the invention.

Advantageously, the various workstations may include identical tools or equipment of varying design. Workarea 21, for example, includes a Moroman K10AS laser cutting robot 46 and associated controller 45; a workstation control personal computer 44, and an RS-232 communication connection 36 between the robot controller and the workstation controller PC. Moroman is located in West Carrolton, Ohio. Laser energy from either of the fiber-optic beam multiplexers 23 or 29 is delivered to the workarea over fiber optic cables 47 and 48. A digital control signal connection 32 is established between the robot controller and a digital I/O switch 28, and a local area network connection 43 is maintained among workstation controllers and the cell controller 38. The digital switch 28 is preferably the asynchronous bidirectional node switch described in the parent to this application, and is incorporated herein in its entirety by reference.

Workarea 24 includes an Anorad custom 5-axis computer numerical controller (CNC) machining center 26, and controller 25, a workstation controller PC 27, and an RS-232 communication connection 35 connected therebetween. Anorad Corporation is based in Hauppauge, N.Y. As with workarea 21, fiber optic cables 49, 50, digital control signal connection 34 and a local-area network connection 42 are similarly provided. With the exception of the different type of motion equipment in this workarea, in all respects, its operation is identical to the workarea 21 described previously.

The preferred embodiment includes two lasers, 22 and 30, and respective fiber-optic beam multiplexers 23, 29 which provide a resource, in this specific case, laser energy. There may be any number of resources and they may be fundamentally different. Each resource, however, provides something to the workcell shown in the figure to be shared between the various workareas so as to increase the utilization of the resource. This approach reduces the total cost of the workcell when compared to an otherwise identical system with independent workareas, each requiring a copy of that resource if it were not shared.

Digital control signals connect each resource, 22 and 30, including its associated fiber optic beam multiplexer 23 or 29, to the digital I/O switch 28, thereby providing switchable control of the resource. If the resource is programmable, as are the lasers in the preferred embodiment, they are connected to the cell controller PC 38 via RS-232, or equivalent, connections 51, 52, thereby allowing reconfiguration before or during operation.

The digital I/O switch 28 is configured by software resident on the cell controller PC 38. This software can change the state of the digital I/O switch by signalling over the connections 37, such that at any given instant, control of a specified laser is provided by, and distribution of its energy is directed to, a specified workarea. A third state is provided whereby a resource may be entirely disconnected from the system. Additionally, one or more resources may be connected to one or more workareas simultaneously.

The software resident on the cell controller also arbitrates resource contention, and allocates resources based on requests from the workstation controllers 44 or 27 in the designated workareas 21 or 24 and the availability of the requested resource. This operation is unique to the configuration of the invention because the cell controller PC only switches control and energy distribution. Actual control of the allocated resource is managed by the equipment controller over digital control signals that are established between the requesting equipment controller 45 or 25, and the allocated resource; i.e., a laser. Unlike conventional hierarchal control structures that route such signals through a next level controller (the cell controller 38, for example), this configuration provides instantaneous real time control of the allocated resource by the requesting controller.

Using workarea 21 and laser 22 for illustration purposes, in operation an equipment operator indicates that a particular operation will be run at the workarea according to an application chosen from a list supplied on the workstation controller PC 44. The appropriate files are fetched by the workstation controller 44, which then downloads the appropriate code to the equipment controller 45 over the RS-232 serial communication link 36. Once this is complete, the operator is notified that the application is ready to run. Before starting execution of the application program at the workarea, the workstation controller determines which, if any, resources are needed, then initiates a request for allocation of the needed resources by sending a request message to the cell controller.

If the requested resource is available, it will be allocated to the workarea. Once a resource has been allocated, the software resident on the cell controller PC 38 reprograms the resource to the requirements of the application by sending command sequences over the RS-232 connection 51. Once configured, the digital control signals 33 will be switched at the digital I/O switch 28 by the software running on the cell controller PC 38. In this case, the digital I/O switch control connections 37 are used to connect the equipment controller 45, via path 32 to the laser 22, and the laser energy will be switched via multiplexer 23, so as to direct energy to the requesting workarea 21. This process is identical for each request.

Once requested and granted, a particular configuration will remain in effect until the workstation controller 44 is notified by the equipment controller 45, that the resource is no longer needed. The workstation controller 44 then informs the cell controller PC 38 by sending a complete message in the same manner as the request message, that it no longer needs the allocated resource. At this time the software will de-allocate (disconnect) the resource from the equipment controller by switching the digital I/0 switch 28 and switch the fiber-optic beam multiplexer 23 so that energy is no longer directed to that particular workarea.

An application directory structure provides each workstation and cell controller 38 with a separate working directory which contains run-time and start-up files for each computer, these directories being located on a hard disk associated with cell controller 38. Also included in the applications directory are a series of subdirectories which contain files for downloading to each equipment controller and laser.

Using the directory structure just described, system support is simplified by maintaining all files and data on one system. This, in conjunction with the network configuration, allows distribution of processing between multiple computers, thereby enabling tasks to run in parallel, which tends to decrease contention for CPU time. Once an application is loaded to a workstation, cell controller 38 is entirely freed from any activity required to manage the application, allowing another application to be developed or to run simultaneously on another workstation, or the cell controller, without any effect on run time.

Each workstation also preferably includes workstation management software from which an operator may load and run any application applicable to that workstation, and queue up jobs for a resource which may be currently unavailable. Generally, the workstation manager software includes a visual interface in menu form, the queuing structure just mentioned, and an equipment server which provides an interface to the equipment controller.

Having thus described our invention, we claim:

1. A system for sharing an energy resource, comprising:

at least one energy resource;

energy-routing means for receiving the energy from the resource and directing the energy along one of a plurality of energy paths;

a plurality of work areas, each connected to receive energy from the resource over one of the energy paths to perform a process;

a control computer;

a local-area network connecting the control computer to the work areas so that each work area may receive information relating to the process to be performed there; and a digital network connected to the energy resource and each work area, whereby a work area may assume direct, real-time control over the energy resource in order to perform a particular process.

2. The system of claim 1, wherein the energy resource is a laser.

3. The system of claim 2, wherein the energy-routing means is a laser-beam multiplexer, the energy path being an optical fiber.

4. A distributed laser processing communication and control structure, comprising:

a plurality of lasers, each outputting an energy beam;

a plurality of work areas wherein processes are performed with tools requiring direct use of a laser's energy beam without converting the beam into another form;

a laser beam-delivery system operative to route the energy beam of a particular laser to a work area on a time-shared basis; and a digital network connecting each work area to each laser whereby a given work area may assume direct, real-time control over the laser and the energy received through the beam delivery system in order to perform a given process.

5. The distributed laser processing communication and control structure of claim 4, further including:

a cell controller storing information relating to the processes performed in the work areas, and a local-area network interconnecting the cell controller to the work areas over which the information be received by the work areas from the cell controller.

6. The distributed laser processing communication and control structure of claim 5, further including:

a factory information system computer connected to plurality of cell controllers with a second local-area network, the centralized factory information system computer storing information relating to the processes performed in the various workareas.

7. A workcell for performing distributed laser processing, comprising:

a cell controller storing process-related information;

a plurality of lasers;

a fiber-beam multiplexer associated with the output of each laser, each multiplexer being operative to receive the energy from its respective laser and direct the energy through one of a plurality of optical fibers;

a plurality of work areas, each including a workstation controller;

a communication network connecting each workstation controller to the cell controller in order to receive information relating to a process to be performed in the work area;

processing equipment directed by each workstation controller, each piece of equipment including a tool attached to one of the optical fibers to receive laser energy; and a digital network connecting each work area to each laser in such a way that each work area may assume direct, real-time control over a laser in order to perform a particular process.

\* \* \* \* \*